US010229513B2

(12) United States Patent
Chakravorty et al.

(10) Patent No.: US 10,229,513 B2
(45) Date of Patent: Mar. 12, 2019

(54) COGNITIVE COLOR SCHEME ADVISOR FOR DYNAMIC MODIFICATION OF DIGITAL MEDIA IN A COLLABORATIVE ENVIRONMENT WITH COLOR BLIND INDIVIDUALS

(71) Applicant: International Business Machines Corporation, Armonk, NY (US)

(72) Inventors: Rajib Chakravorty, Epping (AU); Lenin Mehedy, Doncaster East (AU)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/400,295

(22) Filed: Jan. 6, 2017

(65) Prior Publication Data

US 2018/0197313 A1 Jul. 12, 2018

(51) Int. Cl.
*G06T 11/00* (2006.01)
*G09G 5/02* (2006.01)
*G09B 21/00* (2006.01)

(52) U.S. Cl.
CPC .......... *G06T 11/001* (2013.01); *G09B 21/008* (2013.01); *G09G 5/02* (2013.01)

(58) Field of Classification Search
CPC ........ G06T 11/001; G09B 21/008; G09G 5/02
See application file for complete search history.

(56) References Cited

U.S. PATENT DOCUMENTS 7,145,571 B2 12/2006 Jones et al.
8,542,324 B2 9/2013 Wang et al.

| 2004/0085327 | A1* | 5/2004 | Jones | G09B 29/003 345/591 |
| 2009/0128871 | A1* | 5/2009 | Patton | G06T 11/001 358/520 |
| 2014/0340644 | A1* | 11/2014 | Haine | A61B 3/066 351/239 |
| 2017/0339216 | A1* | 11/2017 | Carlos | H04L 67/10 |

OTHER PUBLICATIONS

O'Donovan, Peter, Aseem Agarwala, and Aaron Hertzmann. "Color compatibility from large datasets." ACM Transactions on Graphics (TOG). vol. 30. No. 4. ACM, 2011.*
Shawn. "Screen Resolution of Display—Change in Windows 10." Brink. Oct. 21, 2015. Web. May 23, 2018. <http://www.tenforums.com:80/tutorials/4910-screen-resolution-display-change-windows-10-a.html>. Internet Archive. <https://web.archive.org/web/20151021102925/http://www.tenforums.com:80/tutorials/4910-screen-resolution-display-change-windows-10-a.h.*
Robert Hess, "Can Color-Blind Users See Your Site?" https://msdn.microsoft.com/en-us/library/bb263953(d=printer,v=vs.85.aspx, Oct. 9, 2000, 9 pages.

* cited by examiner

*Primary Examiner* — Maurice L. McDowell, Jr.
(74) *Attorney, Agent, or Firm* — David Quinn; Ryan, Mason & Lewis, LLP (57) ABSTRACT

A method for modifying digital media comprises receiving one or more digital media items, determining a plurality of colors and one or more associations between the colors in the one or more digital media items; collecting a color vision profile from one or more color blind individuals in an environment; analyzing the color vision profiles to determine common colors visible by the one or more color-blind individuals; identifying a color scheme for modifying the one or more digital media items to correspond to the common colors visible by the one or more color-blind individuals; and modifying the one or more digital media items using the color scheme.

20 Claims, 6 Drawing Sheets

COGNITIVE COLOR SCHEME ADVISOR FOR DYNAMIC MODIFICATION OF DIGITAL MEDIA IN A COLLABORATIVE ENVIRONMENT WITH COLOR BLIND INDIVIDUALS

BACKGROUND

Color blindness in humans results in the decreased or lack of ability to see color or differences in color. Color blindness may cause difficulties in occupational and educational activities. Color blindness can be the result of problems with the development of one or more sets of color sensing cones in the eye. Color blindness can also be caused by damage to the eye, optic nerve, or parts of the brain.

In a collaborative environment, people are often unaware or unable to choose appropriate colors for presentations displayed for their color blind audience. For example, discussing various color coded elements in items such as diagrams, heat-maps, geographical maps, and/or medical images can be difficult and counter-productive in a collaborative environment if there are color blind people that are part of the collaborative environment who cannot discern or distinguish between the color coded elements. Such issues may be compounded if a collaborative team includes multiple color blind people with contradicting levels or types of color blindness. For example, contrasting levels or types of color blindness between individuals may result some color blind individuals being able to see or distinguish between certain colors, while other color blind people are not able to see or distinguish between those certain colors.

SUMMARY

Illustrative embodiments of the invention provide for a system and method to choose an appropriate color-scheme and/or visual clues dynamically that are suitable for presentation of digital media to an audience that includes multiple color-blind individuals.

According to an exemplary embodiment of the present invention, a method for modifying digital media comprises receiving one or more digital media items, determining a plurality of colors and one or more associations between the colors in the one or more digital media items; collecting a color vision profile from one or more color blind individuals in an environment; analyzing the color vision profiles to determine common colors visible by the one or more color-blind individuals; identifying a color scheme for modifying the one or more digital media items to correspond to the common colors visible by the one or more color-blind individuals; and modifying the one or more digital media items using the color scheme.

According to an exemplary embodiment of the present invention, a system for modifying digital media comprises a memory and at least one processor coupled to the memory, wherein the at least one processor is configured to receive one or more digital media items, determine a plurality of colors and one or more associations between the colors in the one or more digital media items, collect a color vision profile from one or more color blind individuals in an environment, analyze the color vision profiles to determine common colors visible by the one or more color-blind individuals, identify a color scheme for modifying the one or more digital media items to correspond to the common colors visible by the one or more color-blind individuals, and modify the one or more digital media items using the color scheme. According to an exemplary embodiment of the present invention, a computer program product for modifying digital media comprises a computer readable storage medium having program instructions embodied therewith, the program instructions executable by a processor to cause the processor to perform a method comprising receiving one or more digital media items, determining a plurality of colors and one or more associations between the colors in the one or more digital media items, collecting a color vision profile from one or more color blind individuals in an environment, analyzing the color vision profiles to determine common colors visible by the one or more color-blind individuals, identifying a color scheme for modifying the one or more digital media items to correspond to the common colors visible by the one or more color-blind individuals, and modifying the one or more digital media items using the color scheme.

DETAILED DESCRIPTION

Embodiments of the present invention provide systems and methods to dynamically and automatically choose and apply appropriate colors and/or patterns to digital media (e.g. documents, slides, and medical images) based on the existence of color blind people in an audience, viewing a presentation on site or remotely, or in another collaborative environment. In accordance with an embodiment of the present invention, appropriate colors and/or patterns are identified in real-time in a collaborative environment considering multiple color blind people with different visual limitations. According to an embodiment, a system automatically chooses a color scheme and visual clues that may potentially be discerned by and aesthetic for everyone in the targeted audience.

As used herein, term "real-time" refers to output within strict time constraints. Real-time output can be understood to be instantaneous or on the order of milliseconds or microseconds. Of course, it should be understood that depending on the particular temporal nature of the system in which an embodiment of the invention is implemented, other appropriate timescales that provide approximately contemporaneous performance and output can be achieved.

Figure 1:
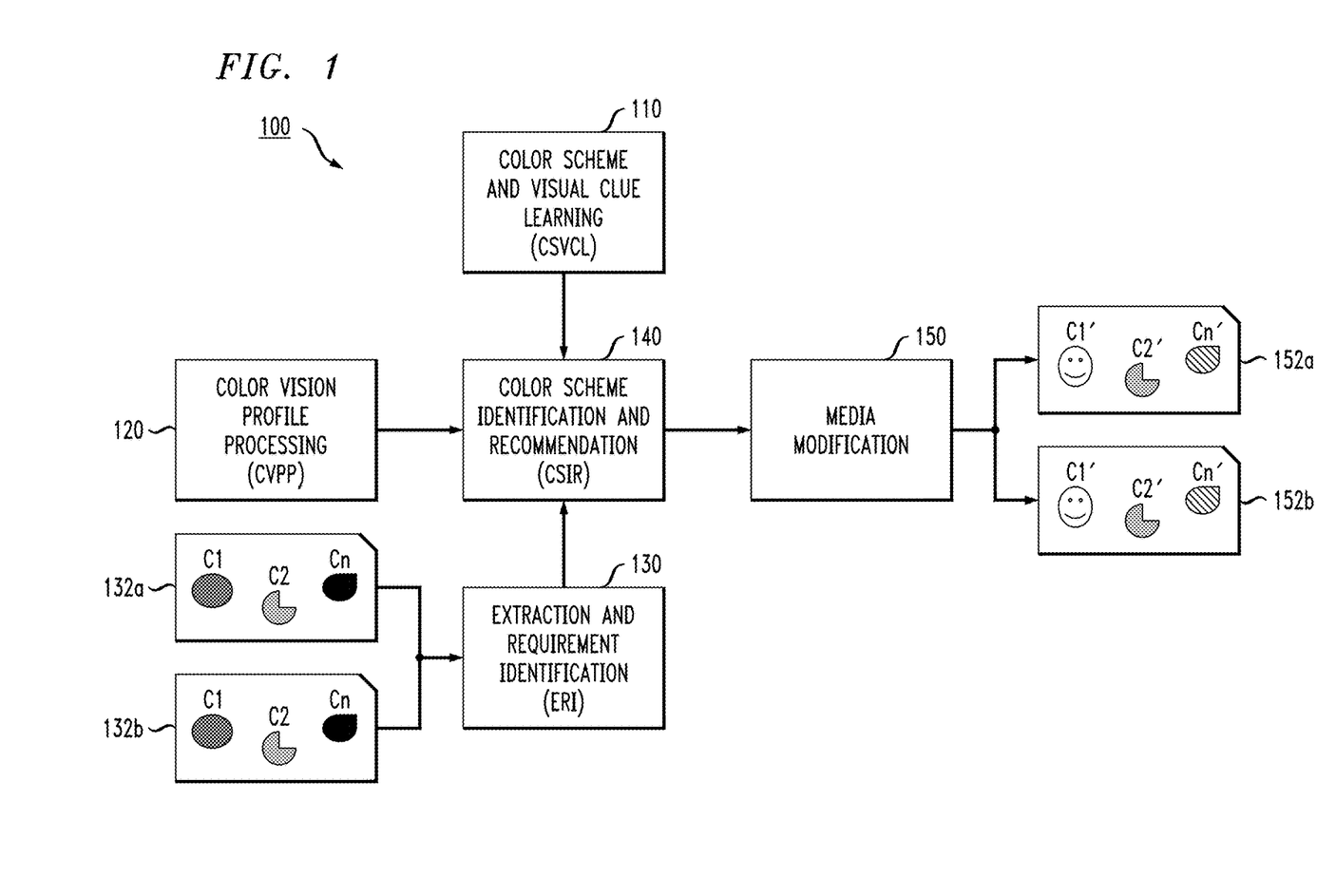
FIG. 1 is a block diagram illustrating a system for choosing an appropriate color-scheme suitable for presentation of digital media in a collaborative environment including one or more color-blind individuals, according to an embodiment of the invention.

FIG. 1 is a block diagram illustrating a system for choosing an appropriate color-scheme suitable for presentation of digital media in a collaborative environment including one or more color-blind individuals, according to an embodiment of the invention. As shown in FIG. 1 (and in FIGS. 2-4) by lines and/or arrows, components are operatively connected to each other via, for example, physical connections, such as wired and/or direct electrical contact connections, and/or wireless connections, such as, for example, WiFi, BLUETOOTH, IEEE 802.11, and/or other communication networks, including but not limited to, a local area network (LAN), wide area network (WAN), cellular network, ad hoc networks, WANET, satellite network or the Internet.

As illustrated in FIG. 1, the system 100 comprises, but is not necessarily limited to, a color scheme and visual clue learning (CSVCL) module 110, a color vision profile processing (CVPP) module 120, an extraction and requirement identification (ERI) module 130, a color scheme identification and recommendation (CSIR) module 140, and a media modification module 150.

Figure 2:
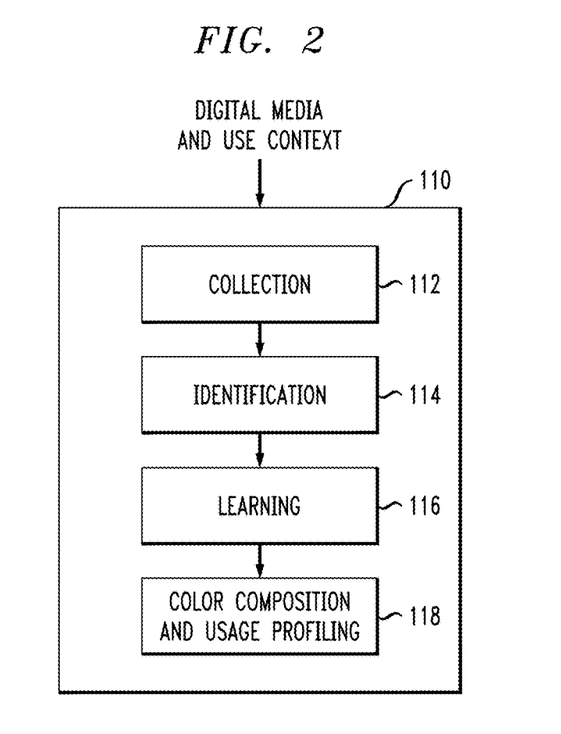
FIG. 2 is a block diagram of a color scheme and visual clue learning (CSVCL) module of the system of FIG. 1, according to an embodiment of the invention.

FIG. 2 is a block diagram of the color scheme and visual clue learning (CSVCL) module 110, according to an exemplary embodiment of the present invention. FIG. 2 illustrates the various functional components included in the CSVCL module 110. For example, CSVCL module 110 comprises a collection component 112, which collects digital media from different sources across a communication network, such as, for example, the Internet to be used as examples in connection with machine learning to learn commonly used visual clues and generally aesthetic color combinations. The digital media includes, but is not necessarily limited to, documents, presentation slides, websites, images (e.g., medical images), videos, etc. which may have been used previously in meetings or for other purposes such as, for example, in publications. In accordance with an embodiment of the present invention, the digital media is associated with a context of use indicating, for example, the purpose, environment and audience corresponding to the digital media. According to different embodiments of the present invention, the received digital media can include or not include use context data. If the digital media includes associated use context information, a usage profile can be developed as explained further herein.

The CSVCL module 110 also includes an identification component 114 operatively connected to the collection component 112. The identification component 114 identifies the objects or sections in the digital media including, for example, colors used, patterns, temporal behavior, such as, for example, blinking, fading in-out, etc., as well as the juxtapositions of such visual attributes. The information from the identification component 114 is then transmitted into learning component 116, such as for example, a neural network, which uses machine learning techniques to learn visual clues, color combinations and their juxtapositions used in existing digital media. For example, the learning component 116 determines commonly used visual clues and color combinations that may be inferred as being aesthetic. The machine learning can be based on the collection of existing digital media from different sources, and the machine learning techniques can include, but are not necessarily limited to, decision tree learning, association rule learning, artificial neural networks, deep learning, inductive logic programming, support vector machines (SVMs), clustering, Bayesian networks, reinforcement learning, representation learning, similarity and metric learning, sparse dictionary learning, and genetic algorithms.

The CSVCL module 110 also includes a color composition and usage profiling component 118 operatively connected to the learning component 116. Based on the determinations made by the learning component 116, the color composition and usage profiling component 118 determines the relative occurrences of certain color compositions used in different digital media. For example, the color composition and usage profiling component 118 may conclude, by way of non-limiting example, that white is a background color in 88% of the digital media, while orange is a background color in 3% of the digital media. The color composition and usage profiling component 118 may also conclude that color combinations, such as, for example, green on white appears in 45% of the digital media, while blue on white appears in 35% of the digital media. The color composition profiles may be stored in the CSVCL module 110, and referred to by the system when determining, for example, based on aesthetics, which color combinations to use in digital media that is being altered for the color blind members of the collaborative environment.

In accordance with an embodiment of the present invention, the color composition and usage profiling component 118 uses available information on the context of use of the collected digital media in order to generate a usage profile of color compositions used in different digital media. For example, collected digital media may be associated with a context of use indicating conditions under which the digital media has been used. In a non-limiting illustrative example, the digital media could have been used in an educational setting, such as, in a university class with a certain number males and females. The use context data can also include, for example, ages, ethnicities, and languages used in the collaborative environment, and whether or not there were color blind people in the audience. Based on this information, CSVCL module 110 can be configured to generate a color profile and an associated usage profile indicating the conditions under which particular colors were used. Therefore, when determining color composition profiles, the system 100, when given usage information, can also be configured to generate a profile for context of use.

The usage profiles as they apply to color composition profiles can be used by the color scheme identification and recommendation (CSIR) module 140 (explained further herein) to recommend color composition profiles for similar contexts. In addition, as the CSIR module 140 receives feedback (described further in connection with FIG. 4), color composition profiles and associated usage profiles can be updated using, for example, reinforcement learning.

Figure 3:
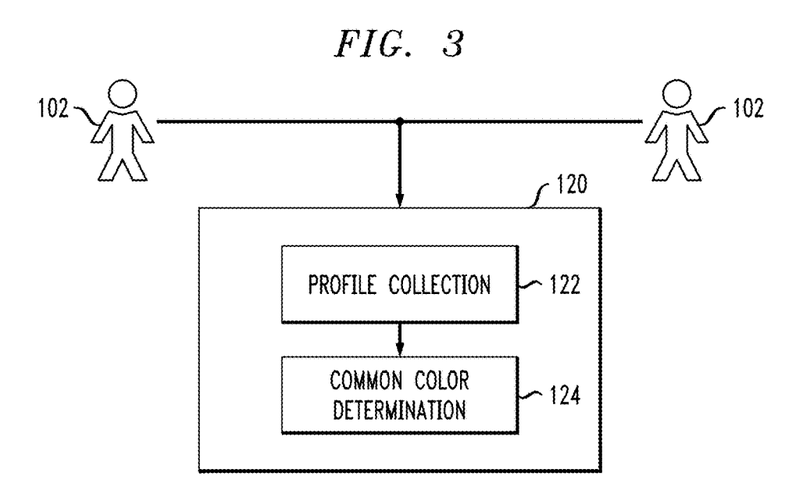
FIG. 3 is a block diagram of a color vision profile processing (CVPP) module of the system of FIG. 1, according to an embodiment of the invention.

FIG. 3 is a block diagram of a color vision profile processing (CVPP) module 120 according to an embodiment of the invention. This module 120 includes a profile collection component 122, which collects color vision profiles of individuals, for example, individuals 102, who are part of the collaborative environment. In accordance with an embodiment of the present invention, members of a collaborative environment can register their color blindness profiles with the system, indicating, for example, which colors they are capable of seeing and/or distinguishing. The profile collection component 122 may be configured to detect which individuals are in attendance at a particular presentation or meeting by, for example, wireless techniques, where devices of the individuals, such as, for example, mobile phones, laptops, tablets or the like, can be sensed using, for example, BLUETOOTH, GPS, or by detecting connection to an access point of a local area network. In the absence of individual's computing devices, the members of the collaborative environment might be identified using badges (swipe/RFID), or through screen sharing detection when the individual is remotely accessing a presentation or meeting. Upon detection of an individual in the collaborative environment, the profile collection component 122 collects color the vision profiles of the detected individual, and sends this information to the common color determination component 124, which determines the common colors and/or patterns that may be visible to all or the majority of audience members, and thereby used in the digital presentation materials. As will be explained in further detail below, the system is capable of real-time detection of the arrival or departure of members to and from the collaborative environment, and is capable of dynamically modifying the digital presentation materials to comport with the color blindness profiles of those individuals that are presently in the viewing audience.

Referring back to FIG. 1, the system 100 also includes an extraction and requirement identification (ERI) module 130. Digital media 132a and 132b that is to be used in the collaborative environment, for example, during a slide presentation, is inputted to the ERI module 130. Digital media items 132a and 132b include, but are not necessarily limited to, documents, presentation slides, websites, images (e.g., medical images) and/or videos. While two digital media items 132a and 132b are illustrated in FIG. 1, there can be any number of digital media items used in a collaborative environment. As illustrated in FIG. 1, the digital media items 132a and 132b each include any number and combination of one or more colors C1, C2, . . . Cn, (where n is an integer), that are extracted from the digital media by the ERI module 130. The ERI module 130 identifies the number and combinations of colors and/or patterns that are required in each digital media item 132a, 132b. The number and combinations of colors and/or patterns is relied on by the system as a requirement or constraint when determining what would be acceptable modifications to the digital media items that would still convey an understanding of the number and combinations of colors and/or patterns in the item even if the colors or patterns are changed.

Figure 4:
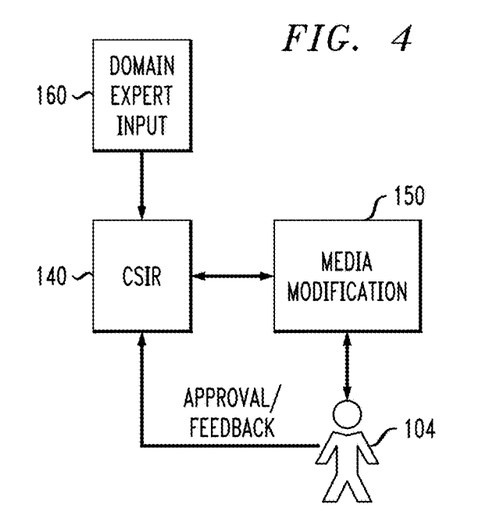
FIG. 4 is a block diagram illustrating inputs and outputs to and from a color scheme identification and recommendation (CSIR) module of the system of FIG. 1, according to an embodiment of the invention.

Included in system 100, illustrated in FIG. 1 and FIG. 4, is a color scheme identification and recommendation (CSIR) module 140. As can be seen in FIG. 1, the CSIR module 140 is operatively connected to each of the CSVCL module 110, the CVPP module 120, the ERI module 130 and the media modification module 150. The CSIR module 140 receives inputs from the CSVCL module 110, the CVPP module 120 and the ERI module 130 in order to automatically identify and recommend a color scheme that includes the necessary color combinations and/or patterns, and satisfies the color blindness requirements of the individuals in the collaborative environment, as well as creating an aesthetically pleasing and/or acceptable presentation with generally acceptable color combinations. As explained above, the input from the CSVCL module 110 is used to establish what are generally aesthetically pleasing and/or acceptable color combinations. The input from the CVPP module 120 determines the color blindness requirements of the individuals in the collaborative environment, and the input from the ERI module 130 determines the necessary color combinations and/or patterns to maintain the integrity of the presentation materials.

In addition, the CSIR module 140 relies on domain expert input 160, accessible via, for example, a network, or otherwise connected databases, to determine various appropriate visual clues such as, for example, color combinations, patterns, temporal patterns, etc., suitable for color blind people, as provided by the domain experts (e.g., optometrists, ophthalmologists). Based on the set of colors and/or patterns identified by CVPP module 120 and machine learning performed by CSVCL module 110, the CSIR module 140 selects a color and/or pattern scheme which may use a subset of those colors which would potentially be aesthetic and be enough to support the color combinations required for the current digital media items 132a and 132b. If the set of identified colors by CVPP module 120 is not enough to meet all of the colors and/or combinations in the digital media items 132a and 132b, the CSIR module 140 can be configured to select from various other attributes such as, for example, patterns (e.g., lines, dots, curves, etc.) or temporal behavior, such as, for example, fading in-out, blinking, etc. to show distinctions between objects in a digital media item.

Based on a recommended color scheme established by the CSIR module 140, media modification module 150, illustrated in FIGS. 1 and 4, identifies various objects and their colors in the inputted digital media 132a, 132b and recolors or applies visual clues to the objects based on the selected color scheme to result in modified media items 152a and 152b including altered colors and/or patterns C1', C2', . . . Cn' based on the recommended color and/or pattern scheme. The media modification module 150 may use any existing object segmentation techniques to scan for, find and digitally transform the objects in the digital media in order to conform to the recommended color scheme.

As illustrated in FIG. 4, in accordance with an embodiment of the present invention, the CSIR module 140 can be configured to generate multiple possible color and/or pattern configurations for a digital media item, which are sent to the media modification module 150. The media modification module 150, in turn, transmits the multiple versions of the modified digital media to one or more users 104 (e.g., an individual giving the presentation) for approval, which can be fed back to the CSIR module 140 as a final determination, and used for reinforcement learning regarding which color schemes to recommend in future situations where there are the same or similar conditions. In addition, the notification of approval or selection of a particular color scheme can be sent from the user 104 to the media modification module 150 for generation of the resulting modified media items 152a and 152b. Communication of the modification options to and from the one or more users 104 can be via, for example, a user device, such as, for example, a computer, tablet or mobile device, receiving an electronic transmission of the modification options via a communication network.

In accordance with an embodiment of the present invention, approval of one or more users 104 is not required, and the CSIR module 140 may automatically determine the optimal color and/or pattern combination for the target audience based on the inputs from the modules 110, 120 and 130 and the domain expert input.

A non-limiting operational example of the proposed system 100 as illustrated in FIGS. 1-4, is described below. In accordance with an embodiment of the present invention, the system 100, and more specifically, the CSVCL module 110, learns color combinations, their juxtapositions, as well as various other visual clues from existing digital media such as, for example, medical images, websites, documents, presentation slides, etc. Such learning permits the CSIR module 140 to recommend suitable color schemes and visual clues that are potentially aesthetic for a general audience. In system 100, the ERI module 130 identifies the colors used in one or more input documents (e.g., digital media items 132a, 132b), and uses the identified colors for collaboration of the number of colors and combinations required.

When people accept a meeting invitation via, for example, a calendar application (e.g., Microsoft® Outlook®), or appear in a meeting where they may be detected by, for example, Bluetooth, RFID or GPS tracking, the system, utilizing CVPP module 120, collects their color vision profiles and preferences provided with their permission. Such color vision profiles may be electronically stored by the system beforehand, be electronically collected from the individuals' computing devices, such as, for example, portable devices like smart phones or tablets, or electronically collected from remote storage, such as, cloud storage. CVPP module 120 removes the contradicting colors (e.g., colors that would not work for all individuals in the collaborative environment) from the profiles of the target audience, and identifies a set of colors visible and/or distinguishable by everyone in the target audience.

The identified set of acceptable colors is then used by the CSIR module 140 to identify a color scheme that may use some or all of these colors. The CSIR module 140 may also identify suitable patterns such as, for example, shading, line patterns, temporal attributes, such as fading in-out and/or blinking, such that the juxtaposition of colors and other attributes, like patterns, fading, blinking, etc., are potentially aesthetic as well as distinguishable for everyone in the targeted audience. The CSIR module 140 may also identify multiple color schemes, which can be submitted for approval to a user (e.g., user 104), such as an author or presenter. Upon approval of a user, which may occur before or during a meeting (e.g., in real time) in which the presentation is being used, the chosen color scheme is then applied to a result in new document (e.g., modified digital media items 152a, 152b), where colors of different parts of the input document (e.g., digital media items 132a, 132b) are modified accordingly by media modification module 150. If required, the media modification module 150 can also apply visual clues including, but not limited to, patterns, blinking, fading, etc., based on the selected color scheme. The chosen color scheme can also be fed back to the CSIR module 140 via a device of the user 104 or by media modification module 150 for reinforcement learning regarding which color schemes to recommend in future situations where there are the same or similar conditions.

Figure 5:
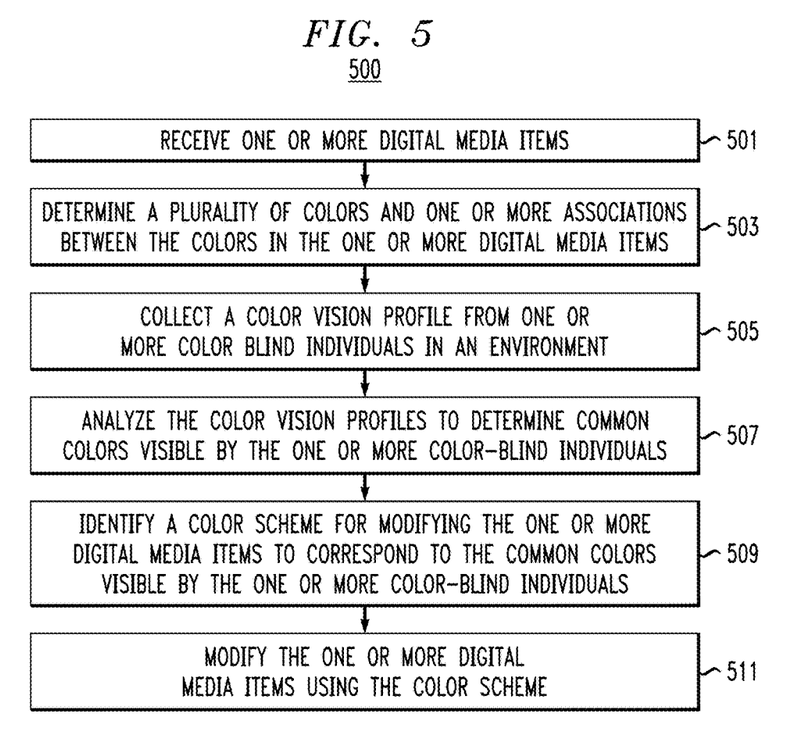
FIG. 5 is a flow diagram of a process for choosing an appropriate color-scheme suitable for presentation of digital media in a collaborative environment including one or more color-blind individuals, according to an exemplary embodiment of the invention.

FIG. 5 is a flow diagram of a process for modifying digital media, according to an exemplary embodiment of the invention. Referring to FIG. 5, the process 500 includes, at block 501, receiving one or more digital media items. The one or more digital media items can include, for example, a presentation slide, a website, an image and/or a video. The digital media items can be received electronically, via, for example, a transmission over a communication network.

The process 500 further includes, at block 503, determining a plurality of colors and one or more associations between the colors in the one or more digital media items. For example, colors used in a digital media item, and associations between the colors are determined. According to an embodiment, an item may include diagrams, figures and/or images where different colors are used to distinguish between different elements in the diagrams, figures and/or images. The determining step, for example, notes the different colors, and how they are used in each elements.

At block 505, a color vision profile is collected from one or more color blind individuals in an environment, and at block 507, the color vision profiles are analyzed to determine common colors visible by the one or more color-blind individuals. For example, in accordance with an embodiment of the present invention, members of a collaborative environment can register their color blindness profiles, which indicate, for example, which colors they are capable of seeing and/or distinguishing. Electronic detection can be performed to determine which individuals are in attendance at a particular presentation or meeting by, for example, wireless techniques using devices of the individuals, by detecting connections to access points of a local area network, by using devices incorporating swipe/RFID technology, and/or through screen sharing detection. Such electronic detection can be performed in real-time with respect to an arrival of one or more color blind individuals in the environment. Color vision profiles from detected individuals in the collaborative environment are analyzed to determine the common colors and/or patterns that may be visible to all or the majority of audience members.

Referring to block 509, the process 500 further includes identifying a color scheme for modifying the one or more digital media items to correspond to the common colors visible by the one or more color-blind individuals. According to an embodiment of the present invention, the identifying includes determining one or more attributes other than color to use for digitally transforming an appearance of one or more colored objects in the one or more digital media items. For example, instead of changing the color of an element, a colored element of a digital media item, such as, for example, a figure, diagram, image, etc., may be digitally transformed by shading, the addition of a pattern or by assigning temporal behavior to the element, such as, for example, fading in an out or blinking. The color scheme for modifying the one or more digital media items can be varied in real-time based on an addition and/or a subtraction of a color blind individual to and from the collaborative environment.

At block 511, the one or more digital media items are modified using the identified color scheme. The modifying may be dynamically performed in response to an electronically detected presence of a color blind individual in the environment. For example, in response to real-time detection of the arrival or departure of members to and from a collaborative environment, digital presentation materials can be dynamically modified to comport with the color blindness profiles of those individuals that are presently in the viewing audience. Modifying can be performed by using one or more object segmentation techniques to digitally transform an appearance of one or more colored objects in the one or more digital media items.

According to an embodiment of the present invention, the process may also include retrieving a plurality of example digital media items from one or more sources, and performing machine learning based on the plurality of example digital media items to learn commonly used color combinations and/or context of previous use. Identifying of the color scheme for modifying the one or more digital media items takes into account the learned commonly used color combinations to, for example, account for aesthetics when modifying digital media. Relative frequencies of occurrence of a plurality of color combinations used in a plurality of example digital media items and/or contexts in which the plurality of color combinations have been used can be identified.

An identified color scheme may be transmitted to at least one device of a user with a request that the user respond by approving or not approving the identified color scheme, and the user's response can be utilized for machine learning of which color scheme to use for a given set of colors and a given group of color blind individuals.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
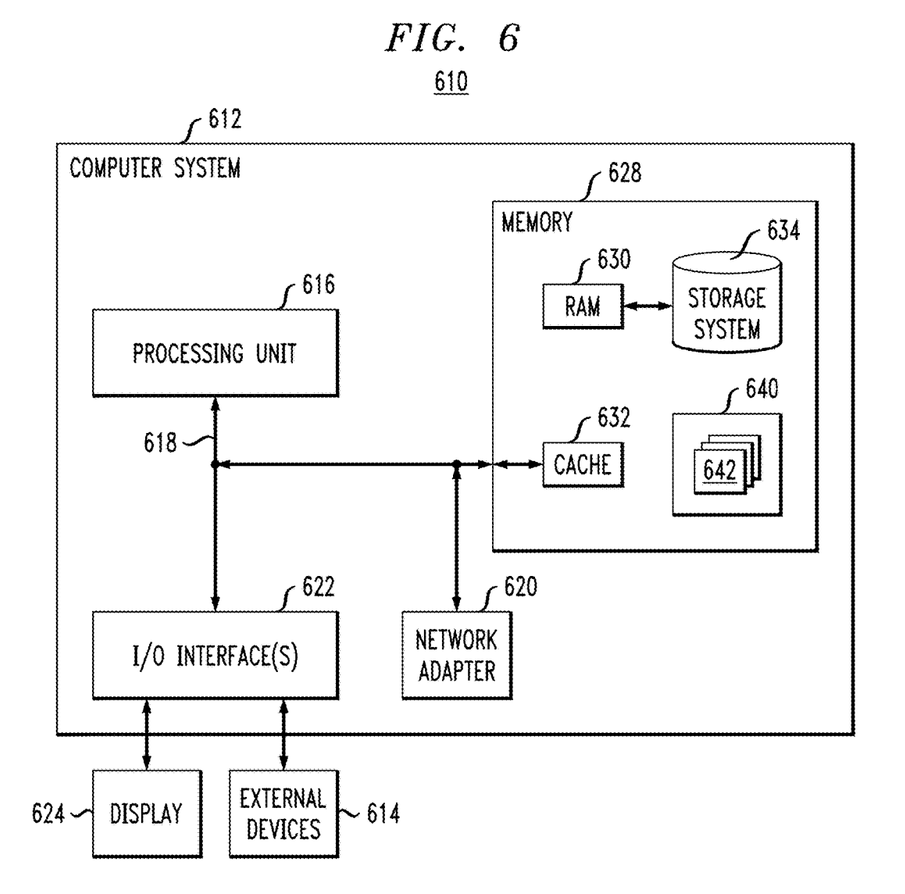
FIG. 6 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 610 in FIG. 6 can be an example of a cloud computing node. Computing node 610 is only one example of a suitable cloud computing node and is not intended to suggest any limitation as to the scope of use or functionality of embodiments of the invention described herein. Regardless, computing node 610 is capable of being implemented and/or performing any of the functionality set forth hereinabove. It is also to be understood that computing node 610 is not necessarily a cloud computing node.

Figure 7:
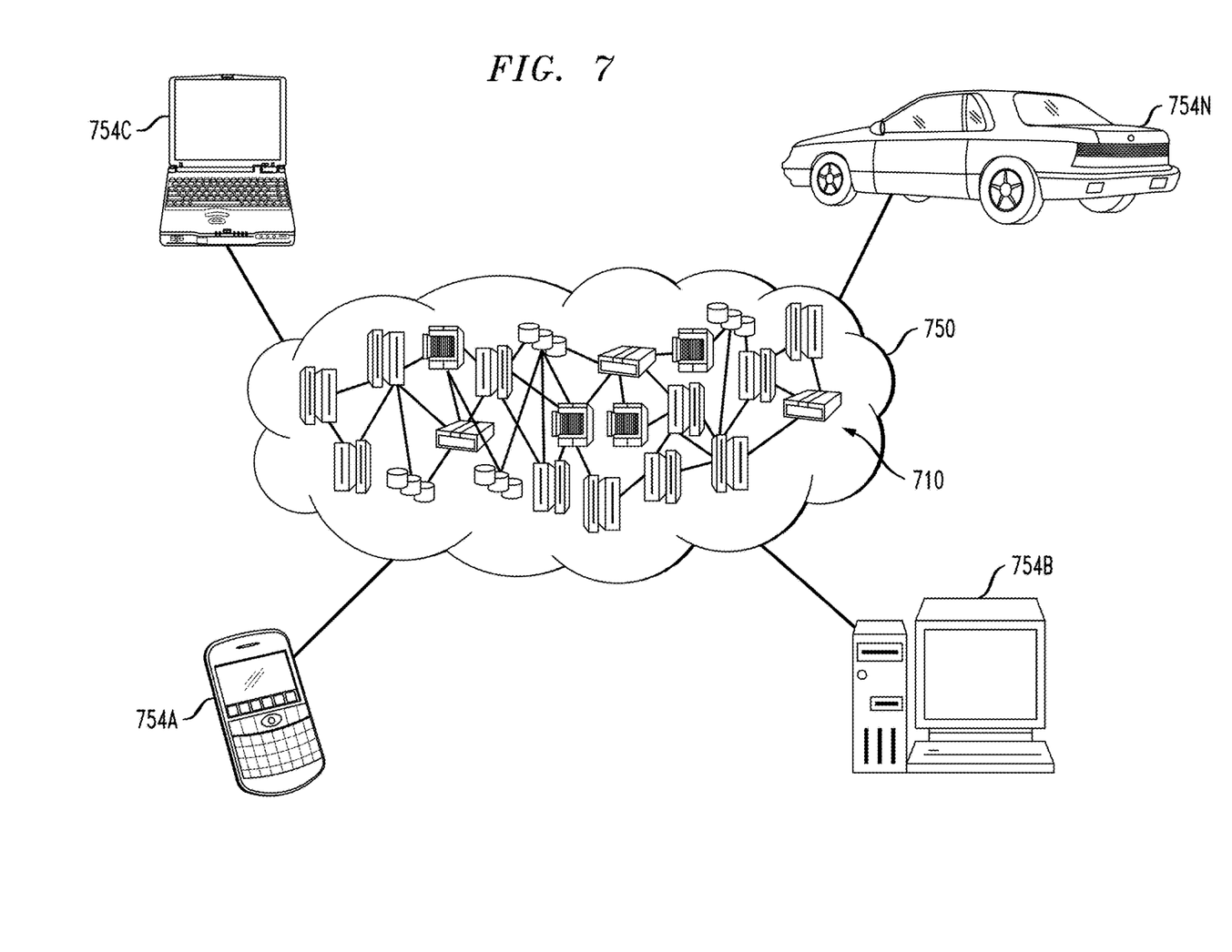
FIG. 7 depicts a cloud computing environment, according to an exemplary embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, a wearable device (not explicitly shown), a personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
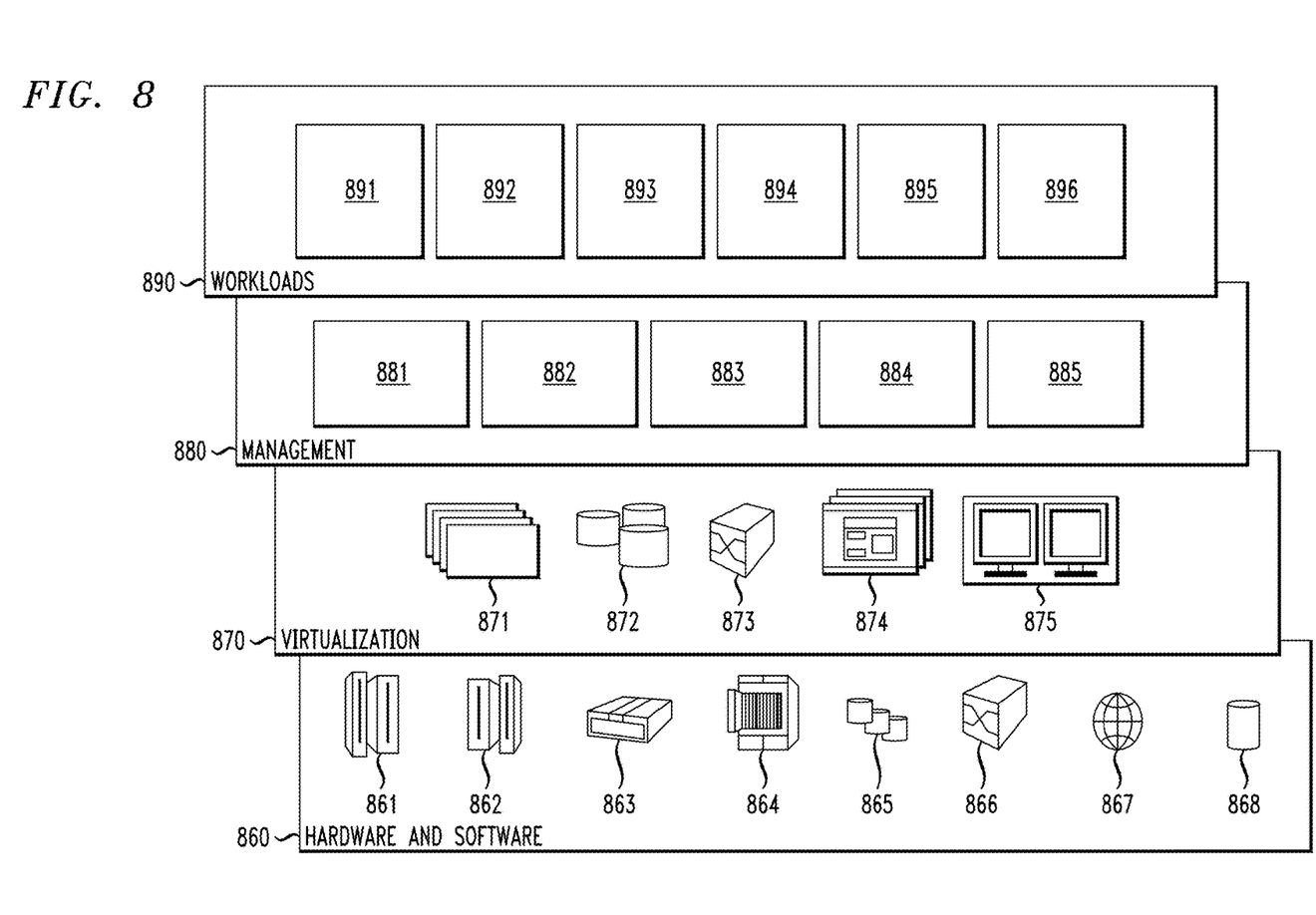
FIG. 8 depicts abstraction model layers, according to an exemplary embodiment of the invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and digital media modification 896, which may implement the functionality described above with respect to FIGS. 1-7.

Although illustrative embodiments have been described herein with reference to the accompanying drawings, it is to be understood that the invention is not limited to those precise embodiments, and that various other changes and modifications may be made by one skilled in the art without departing from the scope or spirit of the invention. For example, the embodiments of the present invention may be applied in multiple types of collaborative environments, including, but not limited to, business, medical and educational environments. For example, in schools and/or colleges or universities, there may be multiple color blind students, and teachers may need to adjust the colors on the educational materials appropriately. In such scenarios, the color vision profiles of all of the students can be stored in the system. The teachers can create educational materials for a general audience as usual and submit those creations to the system. The system can then create modified versions of the educational materials to be displayed during classes, where the colors have been switched appropriately to accommodate the color blind students in the respective classes.

What is claimed is:

1. A method for modifying digital media, comprising:
   receiving one or more digital media items;
   determining a plurality of colors and one or more associations between the colors in the one or more digital media items;
   collecting a plurality of color vision profiles from a plurality of color blind individuals in an environment;
   analyzing the color vision profiles to determine common colors visible by the plurality of color-blind individuals;
   identifying a color scheme for modifying the one or more digital media items to correspond to the common colors visible by the plurality of color-blind individuals; and
   modifying the one or more digital media items using the color scheme;
   wherein the analyzing of the color vision profiles comprises eliminating contradicting colors that would not be discernable by each of the plurality of color-blind individuals or a majority of the plurality of color-blind individuals; and
   wherein the method is performed by at least one computer system comprising at least one memory and at least one processor coupled to the memory.

2. The method according to claim 1, wherein the one or more digital media items are selected from a group consisting of a presentation slide, a website, an image and a video.

3. The method according to claim 1, further comprising electronically detecting presence of the plurality of color blind individuals in the environment.

4. The method according to claim 3, wherein the electronically detecting is performed in real-time with respect to an arrival of the plurality of color blind individuals in the environment.

5. The method according to claim 3, wherein the modifying is dynamically performed in response to an electronically detected presence of the plurality of color blind individuals in the environment.

6. The method according to claim 1, further comprising:
   retrieving a plurality of example digital media items from one or more sources; and
   performing machine learning based on the plurality of example digital media items to learn commonly used color combinations.

7. The method according to claim 6, wherein the identifying of the color scheme for modifying the one or more digital media items takes into account the learned commonly used color combinations.

8. The method according to claim 6, further comprising identifying relative occurrences of a plurality of color combinations used in the plurality of example digital media items.

9. The method according to claim 1, wherein the identifying of the color scheme for modifying the one or more digital media items comprises determining one or more attributes other than color to use for digitally transforming an appearance of one or more colored objects in the one or more digital media items.

10. The method according to claim 9, wherein the one or more attributes are selected from a group consisting of shading, a pattern and temporal behavior of an object.

11. The method according to claim 10, wherein the temporal behavior is selected from a group consisting of fading in and out, and blinking of the object.

12. The method according to claim 1, wherein the modifying of the one or more digital media items comprises using one or more object segmentation techniques to digitally transform an appearance of one or more colored objects in the one or more digital media items.

13. The method according to claim 1, further comprising transmitting the identified color scheme to at least one device of a user with a request that the user respond by approving or not approving the identified color scheme.

14. The method according to claim 13, further comprising utilizing the user's response for machine learning of which color scheme to use for a given set of colors and a given group of color blind individuals.

15. The method according to claim 1, further comprising varying in real-time the color scheme for modifying the one or more digital media items based on at least one of an addition and a subtraction of a color blind individual to and from the environment.

16. A system for modifying digital media, comprising:
    a memory and at least one processor coupled to the memory, wherein the at least one processor is configured to:
    receive one or more digital media items;
    determine a plurality of colors and one or more associations between the colors in the one or more digital media items;
    collect a plurality of color vision profiles from a plurality of color blind individuals in an environment;
    analyze the color vision profiles to determine common colors visible by the plurality of color-blind individuals;
    identify a color scheme for modifying the one or more digital media items to correspond to the common colors visible by the plurality of color-blind individuals; and
    modify the one or more digital media items using the color scheme;
    wherein, in analyzing of the color vision profiles, the at least one processor is configured to eliminate contradicting colors that would not be discernable by each of the plurality of color-blind individuals or a majority of the plurality of color-blind individuals.

17. The system according to claim 16, wherein the at least one processor is further configured to:
- retrieve a plurality of example digital media items from one or more sources; and
- perform machine learning based on the plurality of example digital media items to learn commonly used color combinations.

18. The system according to claim 16, wherein in identifying the color scheme for modifying the one or more digital media items, the at least one processor is further configured to determine one or more attributes other than color to use for digitally transforming an appearance of one or more colored objects in the one or more digital media items.

19. The system according to claim 16, wherein the at least one processor is further configured to vary in real-time the color scheme for modifying the one or more digital media items based on at least one of an addition and a subtraction of a color blind individual to and from the environment.

20. A computer program product for modifying digital media, the computer program product comprising a computer readable storage medium having program instructions embodied therewith, the program instructions executable by a processor to cause the processor to perform a method comprising:
- receiving one or more digital media items;
- determining a plurality of colors and one or more associations between the colors in the one or more digital media items;
- collecting a plurality of color vision profiles from a plurality of color blind individuals in an environment;
- analyzing the color vision profiles to determine common colors visible by the plurality of color-blind individuals;
- identifying a color scheme for modifying the one or more digital media items to correspond to the common colors visible by the plurality of color-blind individuals; and
- modifying the one or more digital media items using the color scheme;
- wherein the analyzing of the color vision profiles comprises eliminating contradicting colors that would not be discernable by each of the plurality of color-blind individuals or a majority of the plurality of color-blind individuals.

* * * * *